(12) United States Patent
Winkler et al.

(10) Patent No.: US 8,408,805 B2
(45) Date of Patent: Apr. 2, 2013

(54) ROLLING BEARING

(75) Inventors: Manfred Winkler, Aurachtal (DE);
Daniel Schneider, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 689 days.

(21) Appl. No.: 12/571,607

(22) Filed: Oct. 1, 2009

(65) Prior Publication Data
US 2010/0086249 A1     Apr. 8, 2010

(30) Foreign Application Priority Data
Oct. 2, 2008   (DE) .................. 10 2008 050 232

(51) Int. Cl.
*F16C 19/54*     (2006.01)
*F16C 33/46*     (2006.01)

(52) U.S. Cl. ........................ 384/455; 384/623

(58) Field of Classification Search ............... 384/452, 384/454, 455, 548, 559, 560, 572–580, 618, 384/623
See application file for complete search history.

(56) References Cited

U.S. PATENT DOCUMENTS 3,341,263 A * 9/1967 Pitner ............................. 384/455
3,632,178 A * 1/1972 Pitner ............................. 384/455

FOREIGN PATENT DOCUMENTS

| AT | 2 15 222 Y | 5/1961 |
| DE | 15 25 205 YD | 7/1969 |
| DE | 10 2004 004 325 Y | 8/2004 |
| DE | 196 80 800 YD | 9/2004 |
| DE | 10 2006 010 707 Y | 9/2007 |
| EP | 17 44 069 Y | 1/2007 |
| FR | 20 23 980 Y | 8/1970 |

* cited by examiner

*Primary Examiner* — Phillip A Johnson
(74) *Attorney, Agent, or Firm* — Lucas & Mercanti, LLP

(57) ABSTRACT

A rolling bearing embodied as a radial-axial rolling bearing which has a bearing sleeve in which rolling bodies designed for absorbing axial forces are arranged in pockets of an axial cage. The axial cage has, on its inner side, a centering bevel which is produced by deformation of the axial cage.

8 Claims, 3 Drawing Sheets

Prior Art

ROLLING BEARING

This application claims the priority of DE 10 2008 050 232.4 filed Oct. 2, 2008, which is incorporated by reference herein.

FIELD OF THE INVENTION

The invention relates to a rolling bearing having a bearing bush in which rolling bodies designed for absorbing axial forces are arranged in pockets of an axial cage.

BACKGROUND OF THE INVENTION

DE 196 80 800 B4 discloses an axial rolling bearing composed of a cage which contains cylinder rollers or needles in pockets and which is arranged between two rotor disks. The cage with the rolling bodies held therein is movable at least slightly in the radial direction.

DE 1 525 205 A proposes a rolling bearing which comprises a radial bearing with needles or small rollers as rolling bodies, and an axial bearing with needles or rollers as rolling bodies and a bush or sleeve which has a cylindrical bearing ring for the radial bearing and a radial collar for the axial bearing. Radial-axial rolling bearings of said type are typically pushed onto a shaft and installed into a housing. Fields of application are for example dual-clutch transmissions or hydrodynamic converters in automatic transmissions.

FIG. 1 schematically shows the assembly of a conventional radial-axial rolling bearing. When the radial-axial rolling bearing 1 is pushed onto the shaft 2 as shown in FIG. 1, it may occur that the axial cage 3, which serves to hold the axial rolling bodies 4, is not precisely aligned with the shaft 2. The axial cage 3, when pushed onto the shaft 2, is centered by means of a bevel 5 on the shaft 2. When the radial-axial rolling bearing 1 is situated on the shaft 2 at the level of a groove 6, the axial cage 3 drops into the groove 6 and abuts against an edge 7 of the groove 6, where said axial cage 3 comes to rest. At this point, centering may still be carried out manually, if appropriate, by lifting the axial cage 3. However, when the radial-axial rolling bearing 1 has arrived at a further groove 8, there is the risk that the axial cage 3 comes to rest on an edge of the groove 8, such that the radial-axial rolling bearing 1 cannot be pushed into its final position. At this point, the installation space is limited by a housing 9, such that manual centering is not possible. For this reason, the assembly of such rolling bearings is complex and difficult in certain installation situations.

OBJECT OF THE INVENTION

The invention is therefore based on the object of specifying a rolling bearing which can be installed in an easy and failure-free manner.

SUMMARY OF THE INVENTION

To achieve said object, it is provided according to the invention that, in a rolling bearing of the type specified in the introduction, the axial cage has, on its inner side, a centering bevel.

The centering bevel provided according to the invention has the effect that the axial cage is automatically centered during the installation of the rolling bearing according to the invention, for example when said rolling bearing is pushed onto a shaft, thereby enabling frictionless assembly. In particular, the centering bevel prevents the axial cage from abutting and being blocked against the edge of a shaft onto which the rolling bearing is pushed. The centering bevel which is provided according to the invention serves to facilitate assembly even in poorly accessible installation situations.

In the rolling bearing according to the invention, it is particularly preferable if the centering bevel is produced by deformation of the axial cage.

Particularly reliable functioning is obtained when the angle between the centering bevel and the axial direction is 5° to 60°, in particular 30° to 40°.

The rolling bearing according to the invention may in particular have rolling bodies which are embodied as cylinder rollers.

It may also be provided that the rolling bodies are arranged between the bearing sleeve and a rotor disk which is parallel to the bearing sleeve.

According to one preferred refinement of the invention, the rolling bearing may be embodied as a radial-axial rolling bearing and have rolling bodies which are arranged within the bearing sleeve and which are designed for absorbing radial forces.

BRIEF DESCRIPTION OF THE DRAWINGS

A preferred embodiment of the rolling bearing designed according to the invention is explained in more detail below with reference to the appended drawings, in which.

DETAILED DESCRIPTION OF THE DRAWINGS

Figure 1:
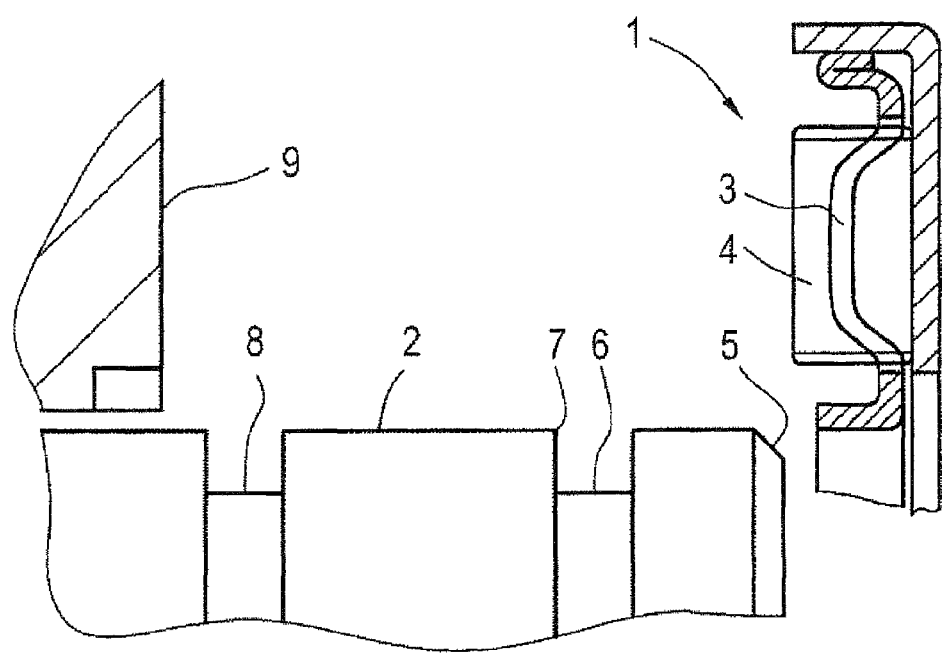
FIG. 1 shows the assembly of a conventional radial-axial rolling bearing.
Figure 2:
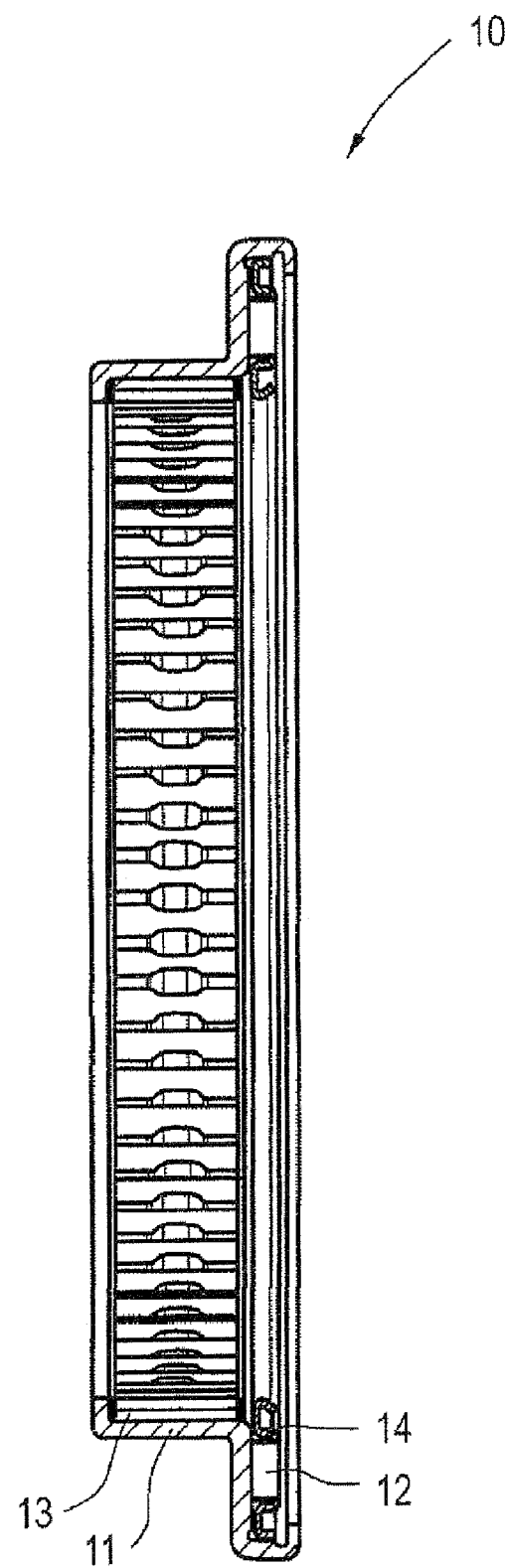
FIG. 2 shows a side view of a radial-axial rolling bearing according to the invention.

The radial-axial rolling bearing 10 shown in a side view in FIG. 2 comprises a bearing sleeve 11 in which are arranged cylindrical axial rolling bodies 12, which are designed for absorbing axial forces and cylindrical radial rolling bodies 13 which are designed for absorbing radial forces. The axial rolling bodies 12 are held in an axial cage 14 between the bearing sleeve 11 and a rotor disk 19. On its inner side, the axial cage 14 has a centering bevel produced by shaping.

Figure 3:
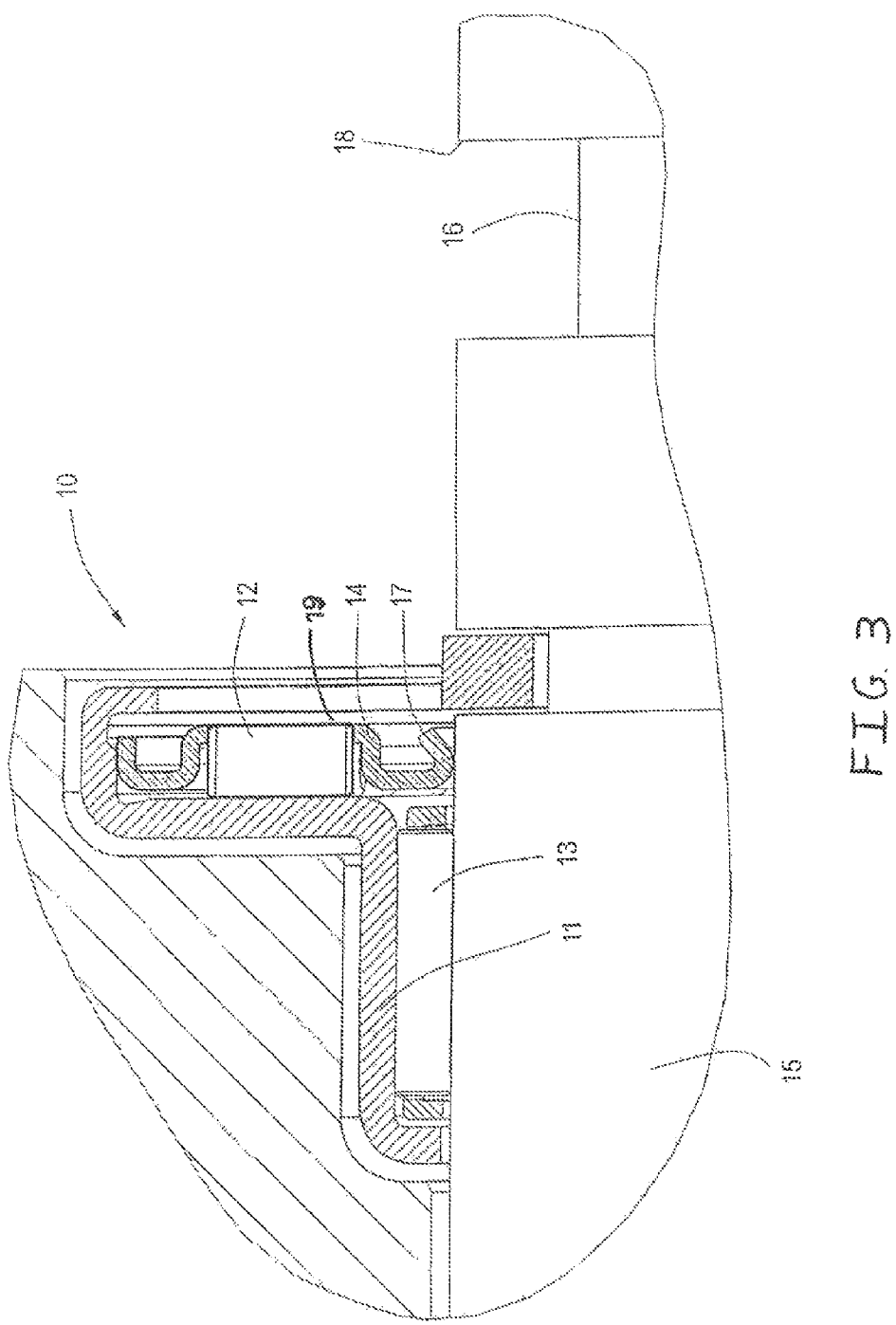
FIG. 3 shows an enlarged detail of the radial-axial rolling bearing according to FIG. 2 during assembly.

FIG. 3 shows a detail of the radial-axial rolling bearing 10 in the region of the rolling bodies during assembly in an enlarged view. The radial-axial rolling bearing 10 is pushed onto a shaft 15 which is provided with grooves 16. When passing the groove 16, the axial cage 14 can move slightly under the influence of gravity, such that said axial cage 14 can move downward in the view shown in FIG. 3. Since the axial cage 14 has a centering bevel 17 on its inner side, said axial cage 14 is prevented from coming to rest against an edge 18 of the groove 16 during assembly, which would prevent the radial-axial rolling bearing 10 from being pushed further onto the shaft 15. The bevel 17, which forms an angle of approximately 40° with the axial direction in the illustrated exemplary embodiment, serves to automatically center the axial cage 14, such that the latter can be pushed, together with the radial-axial rolling bearing 10, beyond the groove 16 and into its installed position.

LIST OF REFERENCE SYMBOLS

1 Radial-axial rolling bearing
2 Shaft
3 Axial cage

4 Axial rolling bodies
5 Bevel
6 Groove
7 Edge
8 Groove
9 Housing
10 Radial-axial rolling bearing
11 Bearing sleeve
12 Axial roiling bodies
13 Radial rolling bodies
14 Axial Cage
15 Shaft
16 Groove
17 Centering bevel
18 Edge
19 Rotor Disk

The invention claimed is:

1. A rolling bearing, comprising:
an axial cage having an axis of rotation and forming pockets; and
a bearing sleeve in which rolling bodies designed for absorbing axial forces are arranged in the pockets of the axial cage,
wherein the axial cage has, on radially inner end a centering bevel that extends radially outwardly from axis of rotation and axially away from the bearing sleeve.

2. The rolling bearing of claim 1, wherein the centering bevel is produced by deformation of the axial cage.

3. The rolling bearing of claim 1, wherein an angle between the centering bevel and an axial direction is 5° to 60°.

4. The rolling bearing of claim 1, wherein the rolling bodies are embodied as cylinder rollers.

5. The roiling bearing of claim 1, wherein the rolling bodies are arranged between the bearing sleeve and a rotor disk, which is parallel to the bearing sleeve.

6. The rolling bearing of claim 1, further comprising further rolling bodies which are arranged within the bearing sleeve to absorb radial forces.

7. The rolling bearing of claim 1, wherein the rolling bearing is a constituent part of a dual-clutch transmission.

8. The rolling bearing of claim 1, wherein an angle between the centering bevel and an axial direction is 30° to 40°.

* * * * *